US007143899B2

(12) United States Patent
Varis et al.

(10) Patent No.: US 7,143,899 B2
(45) Date of Patent: Dec. 5, 2006

(54) FILTER ELEMENT AND METHOD FOR MANUFACTURING THE PLATES THEREOF

(75) Inventors: Juha Varis, Lappeenranta (FI); Mika Lohtander, Lappeenranta (FI)

(73) Assignee: Andritz Oy, Helsinki (FI)

( * ) Notice: Subject to any disclaimer, the term of this patent is extended or adjusted under 35 U.S.C. 154(b) by 360 days.

(21) Appl. No.: 10/478,330

(22) PCT Filed: May 21, 2002

(86) PCT No.: PCT/FI02/00436

§ 371 (c)(1),
(2), (4) Date: Nov. 20, 2003

(87) PCT Pub. No.: WO02/094412

PCT Pub. Date: Nov. 28, 2002

(65) Prior Publication Data

US 2004/0144714 A1   Jul. 29, 2004

(30) Foreign Application Priority Data

May 21, 2001  (FI) ................................. 20011060

(51) Int. Cl.
*B01D 29/01* (2006.01)
(52) U.S. Cl. .................... 210/486; 210/498; 29/896.62

(58) Field of Classification Search ................ 210/232, 210/435, 483, 485, 497.3, 498, 346, 347, 210/486; 403/83, 109.1, 109.5; 29/896.62, 29/902; 264/DIG. 48, 628; 209/397
See application file for complete search history.

(56) References Cited

U.S. PATENT DOCUMENTS

| 5,023,986 A | * | 6/1991 | Gero et al. ................ 29/896.6 |
| 5,330,644 A | * | 7/1994 | Nilsson .................... 210/323.1 |
| 5,443,723 A | * | 8/1995 | Stankowski et al. .... 210/321.75 |
| 6,059,966 A |   | 5/2000 | Brandhofer et al. |

FOREIGN PATENT DOCUMENTS

| CH | 691 252 |   | 6/2001 |
| EP | 0126213 | * | 11/1984 |
| RU | 2 009 404 |   | 3/1994 |
| RU | 2 078 866 |   | 5/1997 |
| RU | 2 126 472 |   | 2/1999 |
| WO | WO 94/26389 |   | 11/1994 |

* cited by examiner

*Primary Examiner*—Terry K. Cecil
(74) *Attorney, Agent, or Firm*—Nixon & Vanderhye P.C.

(57) ABSTRACT

A filter element for pulp screens comprising at least two plates separated by a distance from each other, wherein one plate has a number of projections formed thereon, and the projections being directed towards the other plate. The plates are attached to each other at the projections.

11 Claims, 3 Drawing Sheets

FILTER ELEMENT AND METHOD FOR MANUFACTURING THE PLATES THEREOF

This application is the U.S. national phase of international application PCT/FI02/00436 filed 21 May 2002 which designated the U.S.

The invention relates to a filter element for pulp screens, the filter element comprising at least two plates at a distance from each other, of which plates at least one is provided with a number of projections made on the said plate by forming, the projections being directed towards the other plate, and which plates are interlocked at the projections, and a method for manufacturing the plates of the filter element.

To certain pulp screens have conventionally been applied the usual methods of sheet metal manufacture such as making openings in the plate, edging, spot welding and other welding. Since one filter may contain over 500 filter elements, their manufacture is cost-sensitive. Uniform quality of the product is also an increasingly important factor.

In known solutions, the rigidity required of the plates comprised in the filter elements is achieved by edging straight reinforcements in the plate. This necessitates a separate work stage, which in turn increases the overall cost of the filter being made considerably.

The aim of the invention is to provide a filter element, in which the requirement of rigidity set for the filter element can be met more economically than before.

This is achieved by means of the filter element according to the invention, which is characterised in that the projections are bordered by straight plate on all sides. In a known structure, where the projections are made in an edging press, the projections always extend from one edge of the plate to the other. In the filter element according to the invention, however, the projections do not extend to the edge of the plate. Between the projection and the edge of the plate always remains a neck formed by the straight plate.

The projections of the plate comprised in the filter element are preferably the shape of a hemisphere or a truncated cone.

Some of the plates being interlocked may be straight and some provided with protrusions. In a preferred embodiment of the invention the arrangement is, however, such that two plates are provided with a number of projections, and that the projections of adjacent plates are fitted to match each other and the plates are interlocked at the projections.

The method for manufacturing the plates comprised in the filter elements according to the invention is characterised in that the projections in the plate are formed at a sheet metal work centre at the same time as the other work stages required for the plate, such as shearing and punching.

It is preferable to manufacture the plates comprised in the filter elements according to the invention in modern, automated sheet metal work centres, where various forming work stages, such as making the said projections, can be performed in addition to the actual shearing and punching.

Further preferable developments of the invention are disclosed in the dependent claims.

The manufacturing technique according to the invention is based on a sheet metal work centre, which is an automatically operated, numerically programmable machine which can be rapidly adapted to the manufacture of different parts. Thus the apparatus is extremely efficient in one-off and varying production, the smallest economical series size being, in practice, one (1) piece. The production speed of the sheet metal work centre is high and it can operate with limited personnel. The sheet metal work centre can be used for perforation, laser cutting, forming, flanging, threading and minor bending. Thus any production guided through the sheet metal work centre is clear and simple from the viewpoint of production control, and in addition independent of the employee.

When manufacturing the filter elements, an edging press does not have to be used for making longitudinal reinforcements, because the individual, local forming, that is, the projections according to the invention, form the reinforcements. Edging is generally acknowledged as the most demanding sheet metal work stage. It is dependent on an employee, and any errors made at the beginning will multiply during the work if several edgings affect the said dimension. The quality of parts manufactured using the sheet metal work centre is, on the contrary, high and differences between the pieces are small, due mainly or solely to the unhomogeneity of the material.

When filter elements are manufactured according to the invention, the construction of the element can be changed almost endlessly when seeking for the optimal values of different parameters for elements of different sizes. Parameters to be optimised are rigidity in the direction of the longitudinal and lateral axes and torsional rigidity partly as their joint effect. Overall optimisation is done by changing the place, shape and size of the projections; the place, size and shape of the holes can also be varied. In practice, it is possible to make an element with a so-called cambered centre, in which the cross-section of the element is thus thickest in the centre and thins towards the edges in the transverse direction of the element. By means of this construction is accomplished tight placement of the filter cloth against the metal frame, and a smoothly forming filtered layer, or cake.

When manufacturing filter elements in accordance with the invention, the construction allows the use of many different joining techniques, such as press connection technique based on form locking, other mechanical joint or one of numerous different welding techniques. Mechanical joining techniques in particular are advantageous in constructions subjected to fatiguing loads, to which a filter element undoubtedly belongs, because according to studies, press connections have been found to possess better fatigue durability with certain materials than, for example, point welding. In welding, the structure of the material to be joined changes and in most cases fatigue durability deteriorates due to the roughening of the edge zone of the joint. This phenomenon does not occur, for example, with press connections.

The invention is described in greater detail in the following, with reference to the appended drawing, in which.

Figure 1:
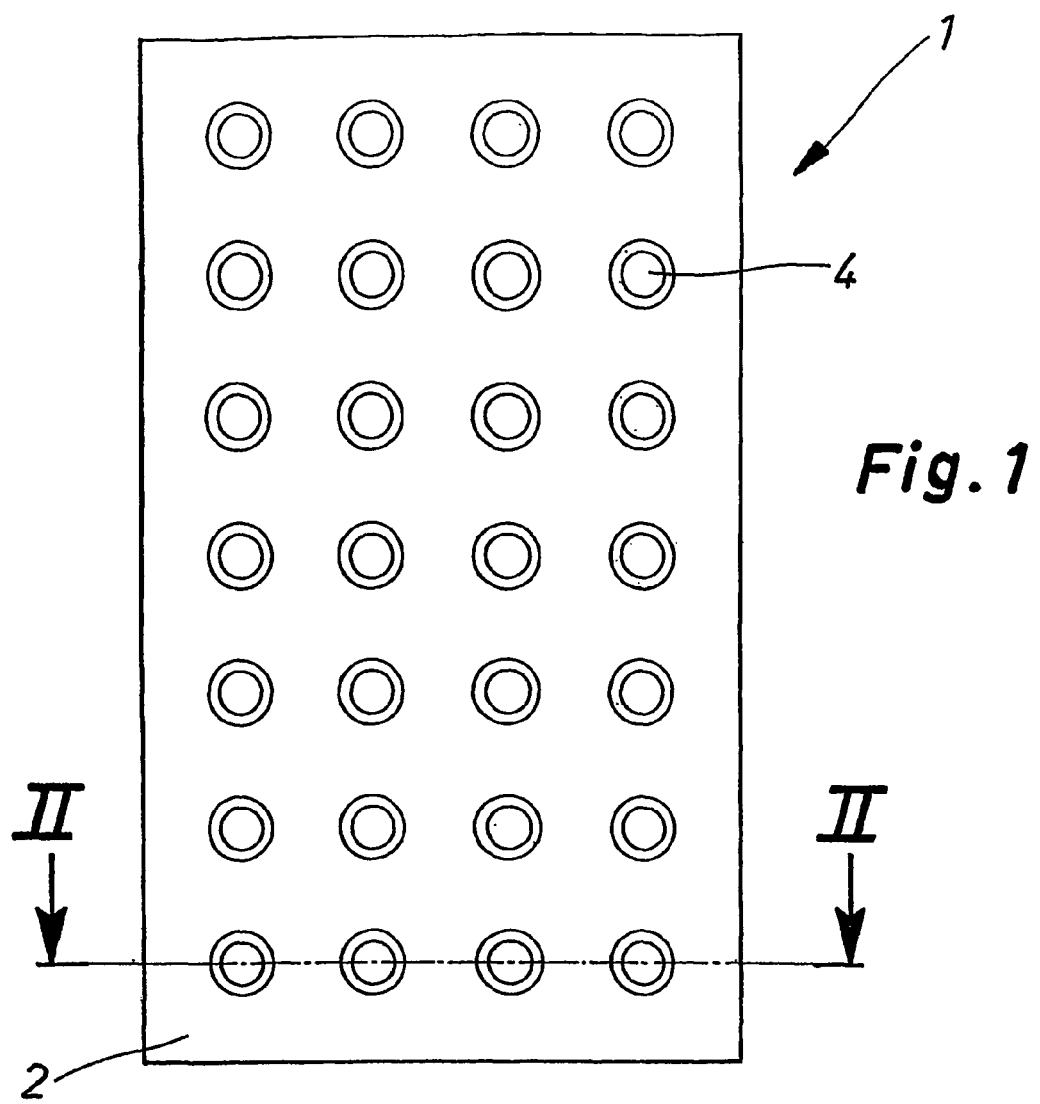
FIG. 1 shows a diagrammatic top view of a filter element according to one embodiment of the invention.
Figure 2:
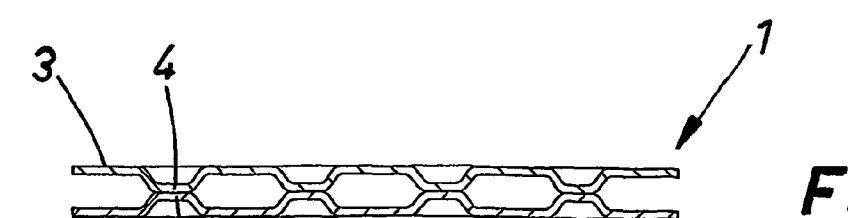
FIG. 2 shows a section along line II—II in FIG. 1.

FIGS. 1 and 2 show diagrammatically a filter element intended for pulp screens, referred to in general by reference numeral 1. In this example, the filter element 1 comprises two plates 2, 3 at a distance from one another. The number of plates may also be greater.

In FIG. 2, both plates 2, 3 are provided with a number of projections 4 extending towards the adjacent plate. The projections 4 are made in the centre of the plate 2, 3 in such a way that between a projection 4 and the edge of the plate always remains a neck formed by the straight plate. The projections 4 of adjacent plates 2, 3 are matched and the plates 2, 3 are interlocked at the projections 4, for example, by welding or riveting, whereby the filter element obtains the required rigidity easily and economically.

The projections 4 made on the plate by forming may also be on only one plate of the filter element 1, in which case the other plate may be a straight plate. Also in this case the plates 2, 3 are interlocked at the projections 4.

When there are projections 4 on both plates 2, 3, the plates 2, 3 can also be interlocked in such a way that a projection 4 on one plate is attached to the straight section on the adjacent plate.

The number, size and mutual distances of the projections 4 are always selected in accordance with the desired strength and rigidity properties and the space available.

Figure 3:
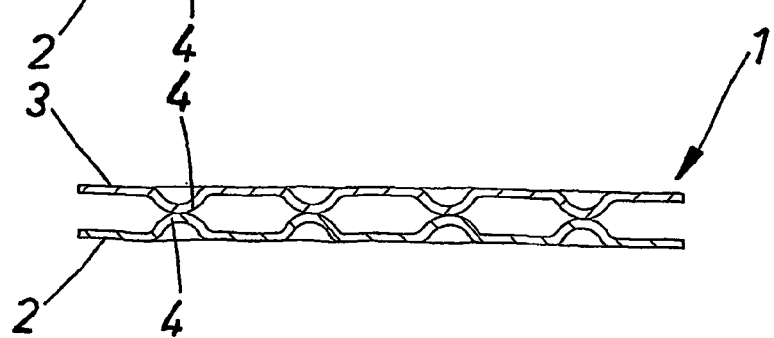
FIG. 3 shows a section according to FIG. 2, which differs from FIG. 2 in the shape of the projections.

In FIG. 2, the projection 4 is the shape of a truncated cone, and in the example of FIG. 3, the shape of a hemisphere.

The projections 4 of the plates 2, 3 shown in the drawing are preferably formed on the plate 2, 3 at the sheet metal work centre together with other shearing and punching required.

Figure 4:
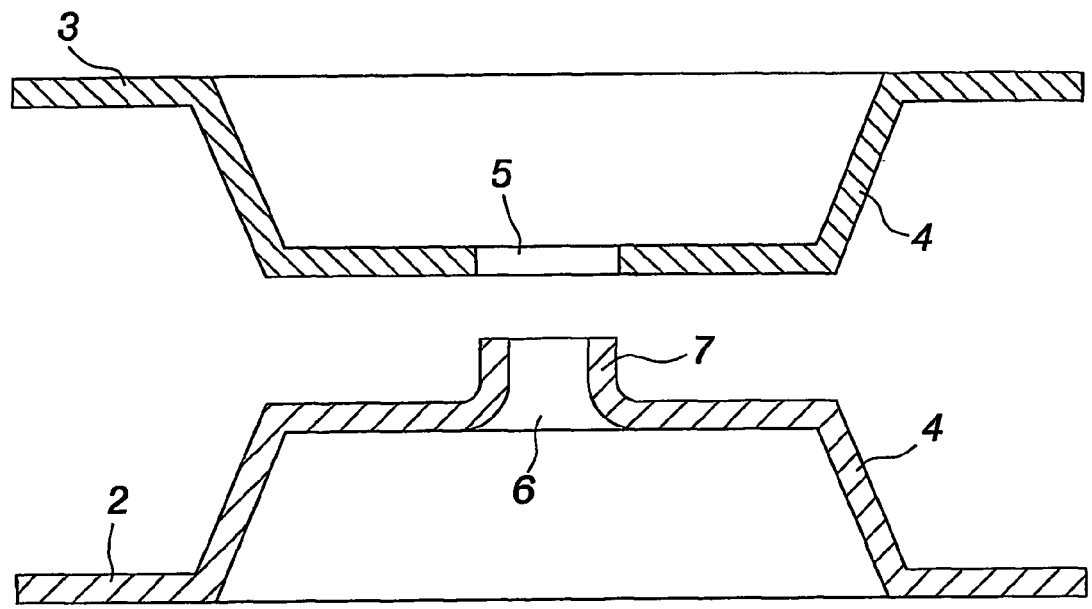
FIGS. 4 and 5 show a preferred manner of interlocking the plates at the projections.
Figure 5:
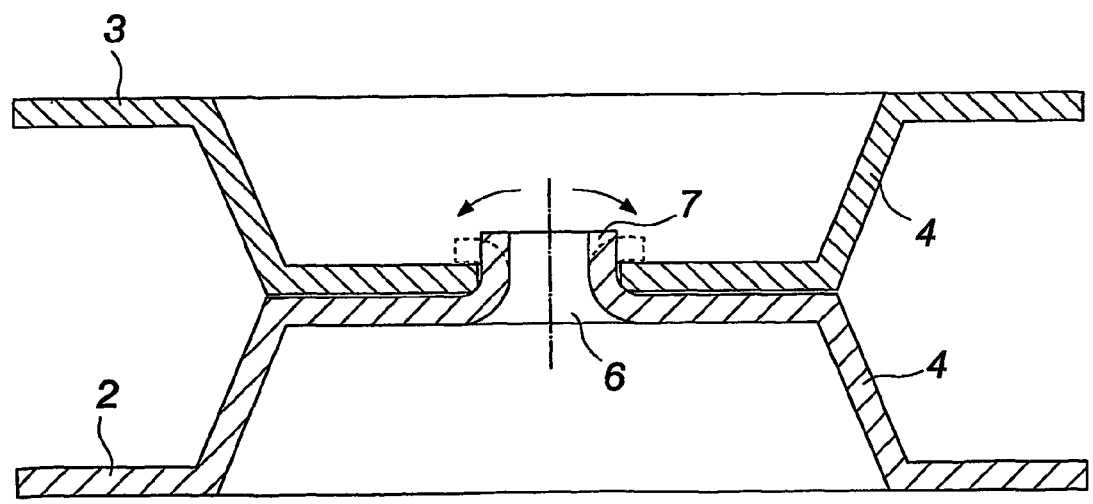

FIGS. 4 and 5 show a preferred manner of interlocking the projections 4. In it, on one of the projections 4 to face each other is formed a hole 5 and on the other a drawn collar 7 provided with a central hole 6, as seen best in FIG. 4. After this, the drawn collar 7 is fitted in the hole 5 (FIG. 5), and after that the interlocking of the parts is carried out in a manner known as such by shaping the drawn collar 7 to the shape shown in broken line.

Figure 6:
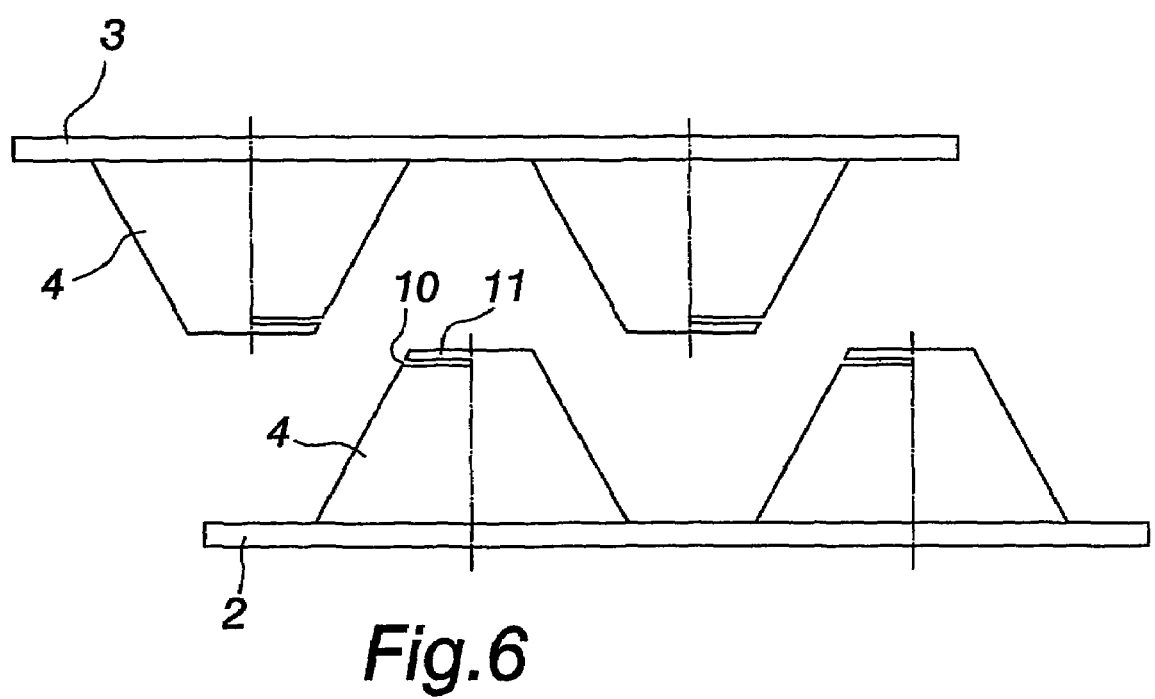
FIG. 6 shows another preferred manner of interlocking the plates at the projections.

In FIG. 6 is shown yet another preferred manner of interlocking the projections 4. In it, the projections 4 to face each other are formed to be mutually identical. On the side of the most preferably flat-bottomed projections 4 is formed a groove 10 parallel to the plate 2, 3. At the projections 4 to face each other, the bottom 11 of one of them is fitted in the groove 10 of the other by means of a mutual movement parallel to the groove 10 of the plates 2, 3.

Compared with conventional joining methods carried out by welding, with screws or by riveting, in the solution according to FIGS. 4 to 6 one work stage is omitted completely and the laborious positioning of the plates with respect to each other is avoided, especially in structures assembled by welding. The methods described save positioning time because the plates 2, 3 become positioned automatically with respect to each other when they are placed on top of each other. The drawn collars, grooves, and the like required for the interlocking can be preferably realised at the sheet metal work centre during the same work stage as the projections 4.

The invention claimed is:

1. A filter element for a pulp screen, the filter element comprising:
   a plurality of plates separated by a distance from each other, wherein at least one plate is provided with a plurality of projections formed on the said plate, the projections being directed towards the other plate, and said plates are attached to each other at the projections, wherein all of the projections on each plate are bordered on all sides by a straight planar section of the plate, wherein the straight planar section extends between the projections and from the projections to edges of the plate and the straight planar section is on both sides of the plate.

2. A filter element as claimed in claim 1, wherein the projections are shaped as a hemisphere or truncated cone.

3. A filter element as claimed in claim 1, wherein two adjacent plates of said plates are each provided with the projections, and that the projections of the adjacent plates align with each other as the adjacent plates are attached to each other at the projections.

4. A filter element as claimed in claim 3, wherein at least one of the projections on one of the adjacent plates further comprises a distal surface with an aperture, and further an opposite projection on the other plate that is aligned with the at least one of the projections comprises a distal surface having an upstanding collar, and wherein the collar fits into the aperture when the plates are attached.

5. A filter element as claimed in claim 3, wherein at least one of the projections on each of the adjacent plates includes a distal end that faces an opposite projection on the adjacent plate, wherein the opposite projection includes an opposite distal end, and said distal end includes a groove parallel to the plate that fits into a groove in the opposite distal end of the opposite plate.

6. A method for manufacturing the plates of the filter element according to claim 1, wherein the projections are formed concurrently with other manufacturing operations, including shearing or punching operations, performed during the manufacturing of the plates.

7. A method as claimed in claim 6, wherein a collar on a projection of one of the plates is deformed to mushroom over an inside edge of an aperture in another of the plates.

8. A method as claimed in claim 6, wherein a side of the projections which faces projections on another plate includes a groove parallel to the plate, and said groove fits into an opposite groove on the another plate.

9. A filter element as in claim 1 wherein the straight planar section of the plates is a planar border on the plate and extending from a base of the projections to the edges of the plate.

10. A filter element as in claim 1 wherein the straight planar section forms a straight line in a cross-section of the plate.

11. A filter element as in claim 1 wherein the straight planar section forms a flat neck between the projections and the edges of the plate.

* * * * *